Jan. 10, 1961   C. E. McCORMICK   2,967,390
APPARATUS FOR MAKING FLEXIBLE SPIRAL WOUND WIRE HOSE
Filed April 8, 1960   8 Sheets-Sheet 2

INVENTOR.
CLARENCE E. McCORMICK

BY
ATTORNEY

INVENTOR.
CLARENCE E. MCCORMICK
BY
ATTORNEY

Jan. 10, 1961 C. E. McCORMICK 2,967,390
APPARATUS FOR MAKING FLEXIBLE SPIRAL WOUND WIRE HOSE
Filed April 8, 1960 8 Sheets-Sheet 6

FIG. 10

INVENTOR.
CLARENCE E. McCORMICK
BY
ATTORNEY

FIG.11

INVENTOR.
CLARENCE E. McCORMICK
BY W. B. Harpman
ATTORNEY

Jan. 10, 1961 C. E. McCORMICK 2,967,390
APPARATUS FOR MAKING FLEXIBLE SPIRAL WOUND WIRE HOSE
Filed April 8, 1960 8 Sheets-Sheet 8

FIG.12

INVENTOR.
CLARENCE E. McCORMICK
BY
ATTORNEY

United States Patent Office 2,967,390
Patented Jan. 10, 1961

2,967,390

APPARATUS FOR MAKING FLEXIBLE SPIRAL WOUND WIRE HOSE

Clarence E. McCormick, Poland, Ohio, assignor to Lee Rubber & Tire Corporation, Youngstown, Ohio, a corporation of New York Filed Apr. 8, 1960, Ser. No. 20,861

13 Claims. (Cl. 57—11)

This invention relates to apparatus for making flexible high pressure hose and more particularly to apparatus for making flexible hose incorporating oppositely disposed layers of spiral wound wires therein.

The principal object of the invention is the provision of apparatus for winding wires in a spiral pattern in a high pressure flexible hose construction.

A further object of the invention is the provision of apparatus for applying even layers of wire cables in a spiral pattern over a rubber-like tube on an elongated mandrel.

A still further object of the invention is the provision of apparatus for forming even layers of spiral wound wire cable over a rubber-like tube on an elongated mandrel wherein the wire cables are stationary and the mandrel and tube revolve.

A still further object of the invention is the provision of apparatus for forming flexible spiral wire wound hose wherein the wire positioning and forming apparatus of the hose moves longitudinally and wherein the hose being formed revolves on its longitudinal axis.

A still further object of the invention is the provision of apparatus for making flexible spiral wound wire hose capable of withstanding unusually high pressures due to the formation of oppositely disposed even layers of spiral wound wire cables in the body of the hose.

The flexible hose and the apparatus for making it disclosed herein constitutes an improvement in the art relating to the formation of wire reinforced flexible hose due to the novel apparatus employed in forming the uniform layers of spirally wound wire cables in the hose body. In wire reinforced flexible hose heretofore known in the art, wires have been fed from individual spools directly into a weaving head which is positioned so that a hose being formed on an elongated mandrel must be moved through the head. As a result of the tensions existing in individual wire strands and their complex paths through the weaving head, the resulting layers of wire are uneven in positioning and in tensioning with the result that the rubber-like material of the hose extrudes through the wire layers at various locations therealong and forms weakened areas which subsequently rupture when the hose is subjected to high pressure.

The present invention relates to apparatus which utilizes a series of wire strands or cables which are free to move and turn and which are held in spaced parallel relation with the hose being formed. A forming head in the presently disclosed apparatus tensions and guides the wire strands or cables uniformly into a spiral wrapped layer on the hose body being formed when the forming head moves progressively along the hose being formed taking up the parallel wire strands or cables as it moves. The resulting spiral wound layers of wire strands or cables are uniformly even both in plane and in tension and in spacing relative to one another with the result that the material of the hose cannot extrude through the spiral wrapped layers of wire strands or cables for the reason that no openings exist. Hoses formed with the apparatus herein disclosed can therefore be subjected to unusually high operating pressures and will not rupture. The problems of forming the spirally wrapped layers of reinforcing wire or cables on a long length of hose have been met by the apparatus disclosed herein as it will rapidly and efficiently rotate a mandrel with the hose body thereon and form spirally wrapped layers of reinforcing wire or cables while at the same time supporting the mandrel and hose being formed so as to prevent displacement from the longitudinal axis thereof.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawings, wherein.

Figure 2:
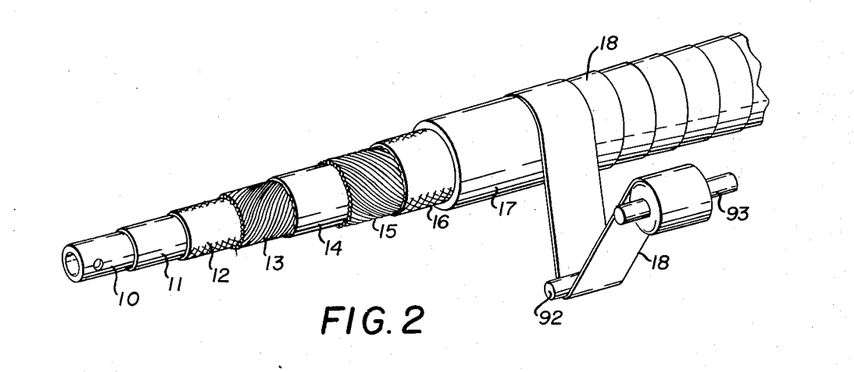
Figure 2 is a schematic view of a portion of the hose being formed including the mandrel therein and the curing and wrapping thereof.

By referring to the drawings and to Figure 2 in particular an explanatory schematic view of a high pressure hose with the various parts thereof broken away may be seen to illustrate the type of hose produced by the apparatus disclosed in the other figures of the drawings.

In Figure 2 a tubular mandrel 10 extends longitudinally through the hose which hose comprises a first rubber tube 11, one or more plies 12 of canvas and rubber, a first layer 13 of spirally wound wires, or wire cables, a second rubber tube 14, a second layer 15 of spirally wound wires or cables and a second layer 16 of one or more plies or canvas and rubber, a third rubber tube 17 and a temporary wrapping of fabric tape 18. The flexible wire reinforced hose comprises a rubber and canvas structure incorporating integrally thereof two radially spaced layers 13 and 15 of spirally wound wires or cables. The composite structure is vulcanized so that the flexible wire reinforced hose is formed. The fabric tape 18 is removed after the vulcanization and curing of the hose so that the rubber tube 17 forms the cover of the hose. The tubular mandrel 10 is also removed from the finished hose.

Figure 1:
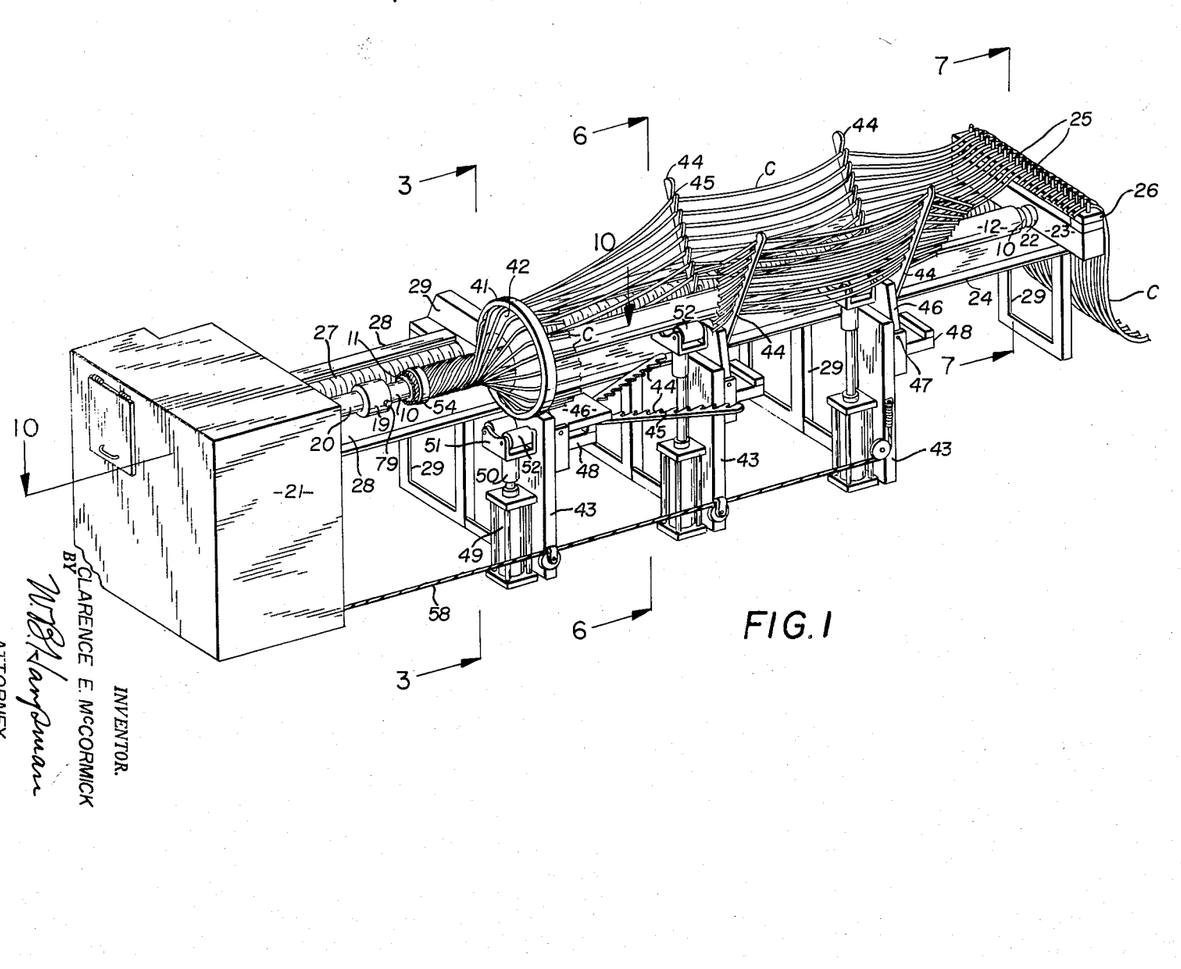
Figure 1 is a perspective view of the apparatus for forming spirally wound layers of wire cable in a flexible hose body.
Figure 7:
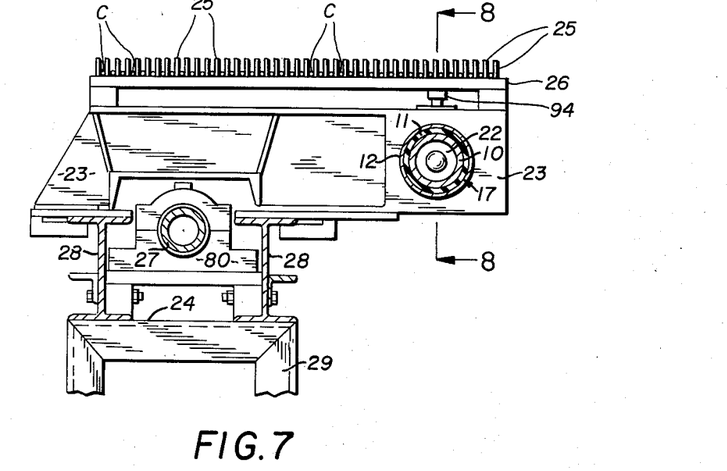
Figure 7 is a vertical section on line 7—7 of Figure 1.
Figure 8:
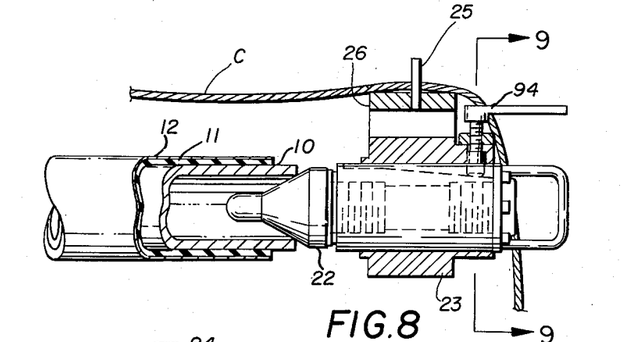
Figure 8 is an enlarged vertical side view on line 8—8 of Figure 7.
Figure 9:
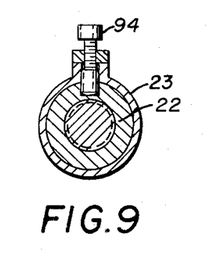
Figure 9 is a vertical section on line 9—9 of Figure 8.

By referring now to Figure 1 of the drawings, it will be seen that the tubular mandrel 10 is illustrated with its left end positioned in a collar 19 which in turn is positioned on the end of a driven shaft 20. Mechanism for driving the driven shaft 20 is positioned within the housing 21 and will be hereinafter described in greater detail. The opposite or right end of the mandrel 10 is detachably engaged in a rotatable axially movable coupling 22 which in turn is mounted in a transverse frame member 23 positioned on one end of a bench 24. A plurality of pins 25, 25 are mounted vertically on a cross piece 26 (see Figure 7 of the drawings) and the cross piece 26 is supported above the transverse frame member 23. A threaded shaft 27 is journalled in the housing 21 as hereinafter described and extends along the bench 24 in parallel relation to the tubular mandrel 10.

Figure 3:
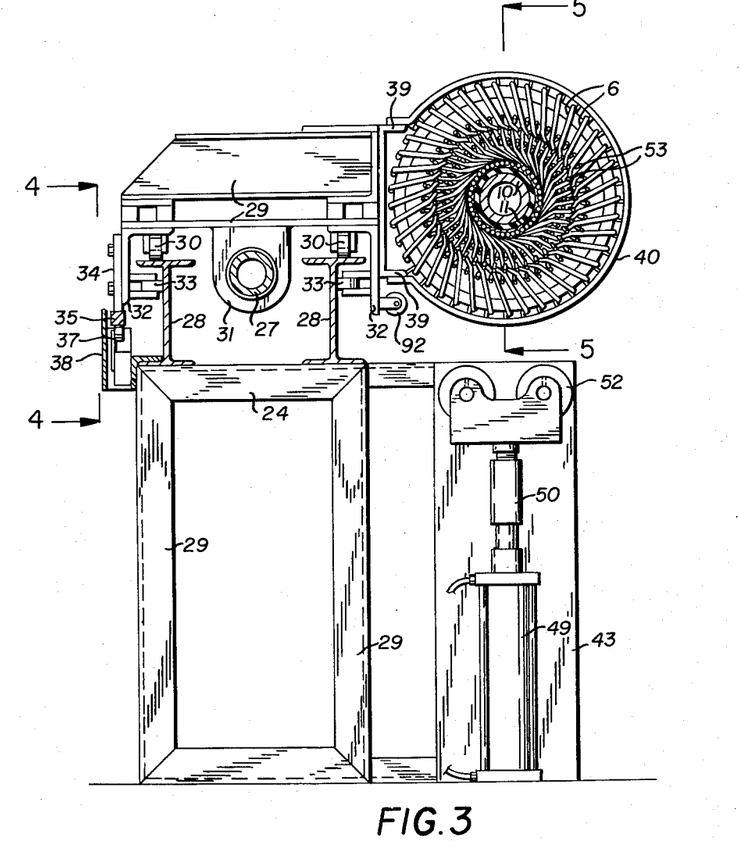
Figure 3 is a vertical section on line 3—3 of Figure 1.
Figure 4:
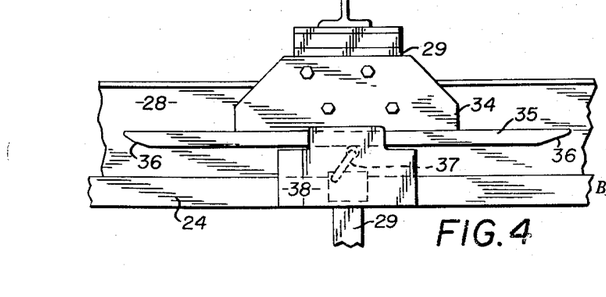
Figure 4 is a side view on line 4—4 of Figure 3.
Figure 10:
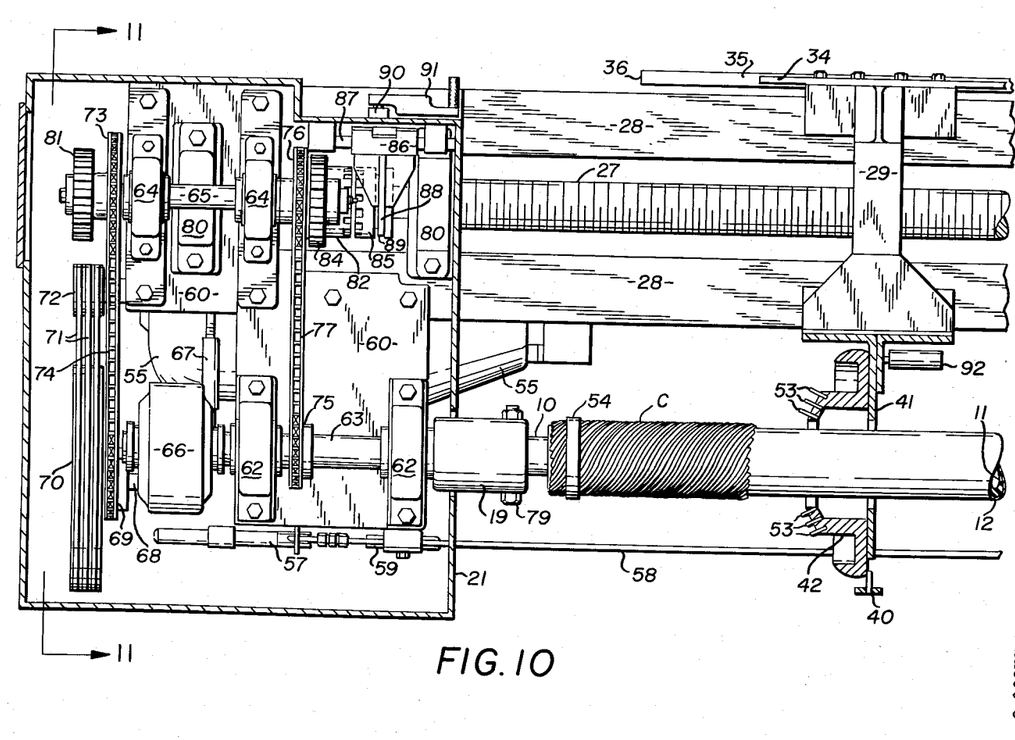
Figure 10 is a top plan view on one end of the apparatus shown in Figure 1 and taken on line 10—10 thereof.

The bench 24 has a pair of spaced parallel rails 28, 28 thereon extending longitudinally thereof between the housing 21 and the transverse frame member 23. The bench 24 is provided with a plurality of legs 29 which support the same and the rails 28, 28 and it will be observed, by referring to Figure 3 of the drawings, that the threaded shaft 27 is located midway between the rails 28. The tubular mandrel 10 and its supporting means are positioned to one side of the bench 24 and the rails 28. A carriage 29 having rollers 30, 30 therebeneath is movably positioned on the rails 28, 28 for longitudinal movement relative thereto. The carriage 29 has a depending bracket 31 thereon which has a threaded opening therein engaged on the threaded shaft 27, thus rotary movement imparted to the threaded shaft 27 will cause the carriage 29 to move longitudinally of the rails 28, 28 and the bench 24. The carriage 29 has depending oppositely disposed side sections 32, 32 and secondary rollers 33, 33 are mounted thereon for engagement with the sides of the rails 28, 28. The carriage 29 is thus prevented from moving laterally of the rails 28, 28 and/or the bench 24. A bracket 34 is attached to one of the depending side sections 32 and carries a horizontally disposed elongated arm 35 on its lowermost end. The opposite ends of the arm 35 are tapered as at 36, 36 to that the arm 35 when moved longitudinally of the rails 28, 28 and the bench 24 will engage and actuate switch control levers 37, 37 as illustrated in Figures 3 and 4 of the drawings. A guard plate 38 is positioned on the bench 24 in spaced relation to the switch control lever 37 to prevent the same from being accidentally engaged. The opposite side of the carriage 29 has a sidewardly extending portion including vertically spaced arcs 39, 39 which support the ends of a circular ring member 40, and an apertured bracket 41 which supports a cone shaped spacing member as best seen in Figures 1, 3 and 10.

By referring to Figures 1, 3, 5 and 10 it will be seen that the cone shaped spacing member 42 has a relatively large center opening therethrough and that the tubular mandrel is positioned centrally of said opening. It will thus be seen that when the carriage 29 moves longitudinally on the rails 28, 28, the cone shaped spacing member 42 and the ring 40 which is spaced thereabout will move longitudinally of the tubular mandrel 10.

Figure 6:
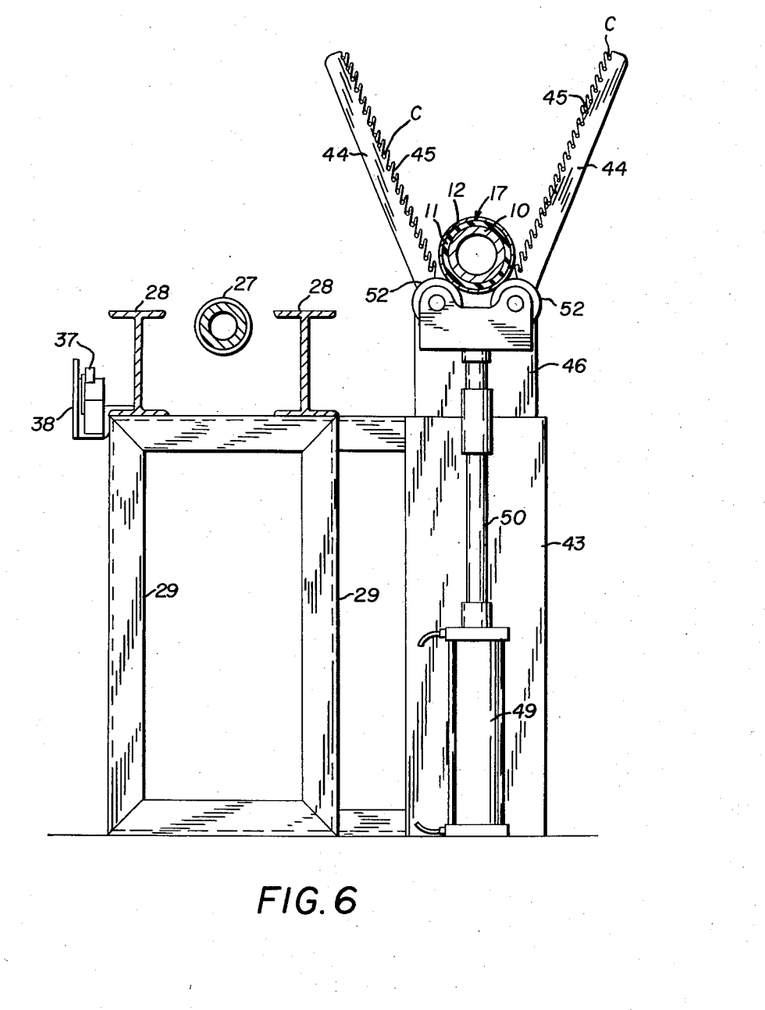
Figure 6 is a vertical section on line 6—6 of Figure 1.

A typical machine formed in accordance with the disclosure herein produces lengths of hose up to 65 feet in length and it therefore will be apparent that the length of the apparatus as seen in Figure 1 has been substantially shortened, for example in a machine capable of producing a 65 foot length of hose it is necessary to support the tubular mandrel 10 at approximately 10 locations therealong. In the disclosure as illustrated in Figure 1, three mandrel supporting units are disclosed each of which comprises a supporting frame 43 positioned along side one of the legs 29 of the bench 24 and directly in under the tubular mandrel 10. The frames 43 each support a pair of retractable wire cable supporting arms 44, 44 as best seen in Figures 1 and 6 of the drawings. The cable supporting arms 44, 44 are provided with a plurality of longitudinally spaced diagonally formed notches 45, 45 so that cables C may be strung therealong and supported thereby. Each pair of the cable supporting arms 44 are secured to a hinged bracket 46 which in turn is pivoted by a pivot 47 to one of the support frames 43. A sideward extension 48 on each of the support frames 43 forms a rest for the hinged bracket 46 and the cable supporting arms 44, 44 when they are moved to horizontal position as shown in the left central portion of Figure 1.

Positioned alongside each of the plurality of support frames 43 there is a hydraulic piston rod 50 which carries a bifurcated member 51 on its uppermost end which in turn journals a pair of rollers 52, 52. When air pressure is supplied to the cylinder 49 the piston rod 50 rises to bring the rollers 52, 52 into supporting engagement beneath the tubular mandrel 10 and/or the hose being formed thereon.

The air supply lines for each of the cylinders 49 are controlled by the switch control levers 37 as hereinbefore described so that when the carriage 29 moves longitudinally of the rails 28, 28 and the bench 24 and approaches one of the pairs of supporting rollers 52, 52 the elongated arm 35 on the carriage 29 actuates one of the switch control levers 37 which in turn actuates the air valve controlling the air supply to the proper cylinder 49 and causes the cylinder 49 to retract piston rod 50 and thereby move the rollers 52, 52 downwardly and away from the tubular mandrel 10 and the hose being formed thereon. Thus, the cone shaped spacing member 42 and its encircling ring 40 may move freely past the area normally occupied by each of the supporting rollers 52, 52. It will be understood that the supporting rollers 52, 52 are provided at spaced intervals longitudinally of the apparatus so that the tubular mandrel 10 and the hose being formed thereon are adequately supported at all times.

Figure 5:
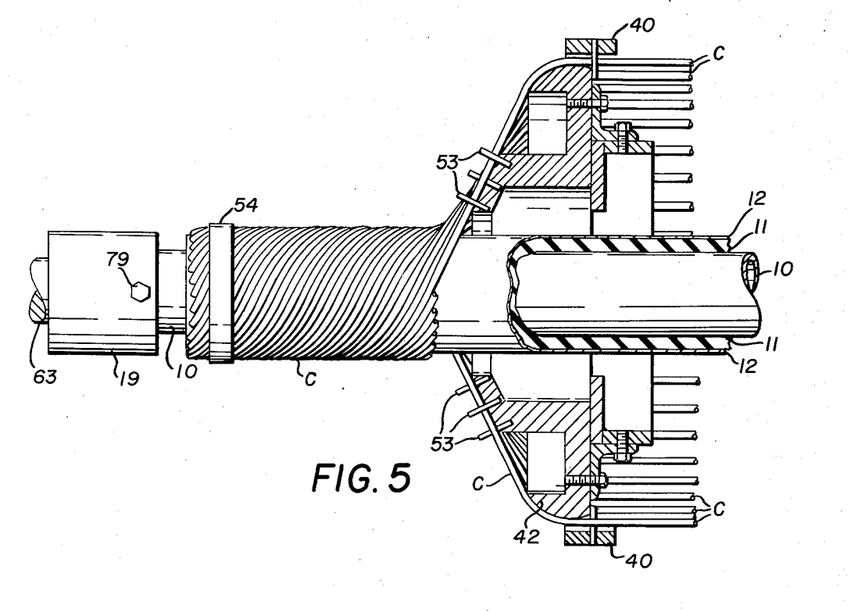
Figure 5 is a vertical section on line 5—5 of Figure 3 on an enlarged scale.

By referring now to Figures 3 and 5 of the drawings it will be seen that each of the plurality of cables C are positioned over the peripheral edge of the cone shaped spacing member 42 and between the same and the ring 40 spaced thereabout. Each of the cables C is then led along the inclined conical surface of the cone shaped spacing member 42 and past the three spaced and staggered pins 53, 53 which guide the individual cables C in a desired path and apply uniform frictional tension thereto. The cables C are wrapped in a spiral pattern around the tubular mandrel 10 and over the first rubber and canvas layer 12 and initially clamped with a band 54. It will thus be observed that when the tubular mandrel 10 is revolved in a clockwise direction as seen in Figures 1, 2 and 5 the cables C will be positioned in immediately adjacent position and under the uniform tension by the apparatus in forming the layer 13 of spirally wound wire cable as heretofore described.

It will thus be seen that the apparatus operates to move the cone shaped spacing member 42 longitudinally of the tubular mandrel 10 while it revolves the tubular mandrel 10 and that the wire cables C are freely fed into the cone shaped spacing member 42 from their loose positions on the cable supporting arms 44, 44. It will be understood that one length of hose is formed at a time on the apparatus disclosed herein and that the plurality of wire cables C used are precut and positioned on the cable supporting arms 44, 44 and over the cross piece 26 and between the pins 25, 25 so that they are free to turn and relax twist and at the same time avoid twisting individually together.

Figure 11:
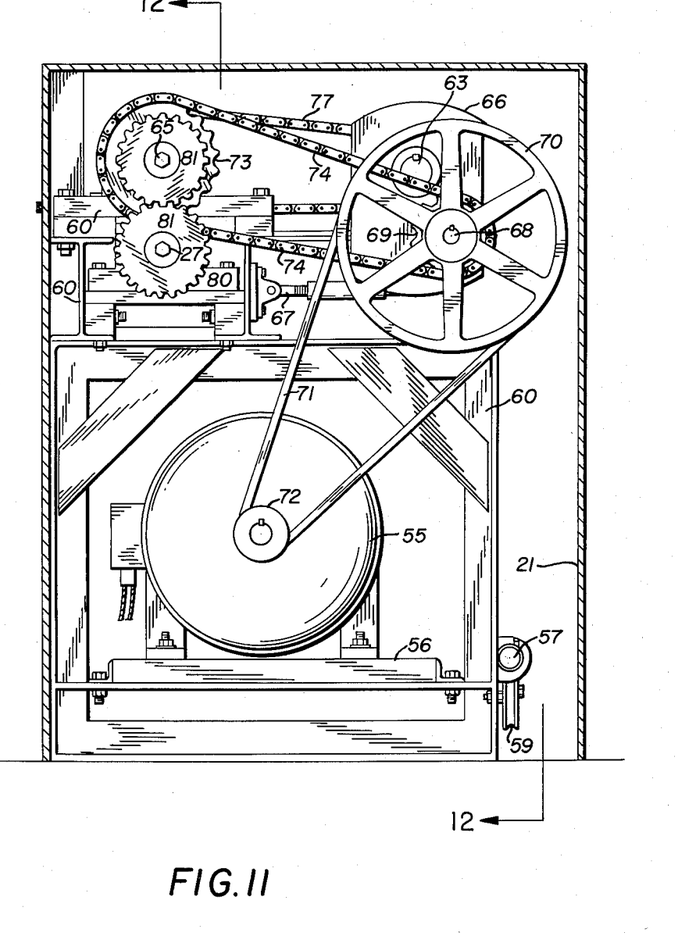
Figure 11 is an end view on line 11—11 of Figure 10.
Figure 12:
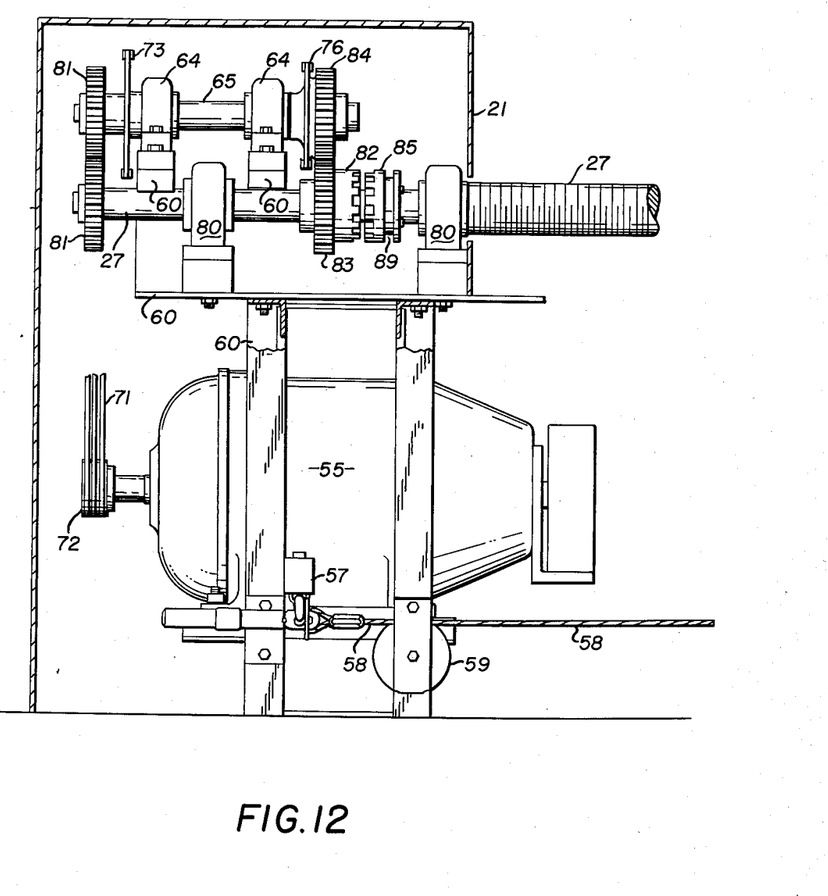
Figure 12 is a vertical section on line 12—12 of Figure 11.

In order that desirable rotating motion may be imparted the tubular member 10 and the threaded shaft 27 apparatus is provided with the housing 21 and illustrated in Figures 10, 11 and 12 of the drawings. By referring thereto it will be seen that an electric motor 55 is mounted on a base 56 in the housing 21 and has a controlling switch 57 positioned adjacent thereto for controlling the supply of electrical energy. The switch 57 is actuated by a cable 58 which is trained over a pulley 59 and extends outwardly of the housing 21 and longitudinally of the apparatus so that a workman can control the apparatus by moving the cable 58 at any point along the bench 24 and thereby stop and start the motor 55.

The gear supporting frame 60 is positioned over the motor 55 in the housing 21. The gear supporting frame has journals 62, 62 thereon supporting a main drive shaft 63 and journals 64, 64 supporting a jack shaft 65. A speed reducing unit 66 is positioned on one end of the main drive shaft 63 and supported relative to the frame 60 by an adjustable linkage 67. The speed reducing unit 63 has a drive shaft 68 extending outwardly therefrom and a sprocket 69 and V belt pulleys 70 are mounted thereon. V belts 71 extend from the V belt pulley 71 to a V belt pulley 72 on the drive shaft of the motor 55. A sprocket 73 is mounted on the jack shaft 65 and a drive chain 74 is trained over the sprockets 73 and 69. A secondary sprocket 75 is mounted on the main shaft 63 and keyed thereto and a third sprocket 76 is journalled on the back shaft 65 for rotation relative thereto and a drive chain 77 is positioned over the sprockets 75 and 76. The main shaft 63 extends outwardly of the housing 21 and carries the collar 19 heretofore referred to.

A bolt and nut assembly 79 is positioned through the collar 19 and the end of the tubular mandrel 10 in a removable manner so as to secure the mandrel 10 to the drive shaft 63.

The threaded shaft 27 has an unthreaded end portion which extends into the housing 21 and is positioned directly below the jack shaft 65 as best seen in Figures 11 and 12 of the drawings, and is journaled on journals 80, 80. The ends of the unthreaded portion of the threaded shaft 27 and the jack shaft 65 are provided with removable gears 81, 81 so that the motion of the jack shaft 65 may be conveyed to the threaded shaft 27 therethrough.

It will thus be seen that rotating motion of the drive shaft of the motor 55 is conveyed by way of the V belts 71 to the V belt pulley 70 on the shaft 68 of the speed reducer 66 and the mechanism of the speed reducer 66 reduces the speed approximately 15 to 1 and delivers the relatively slower motion to the main shaft 63 which rotates the tubular mandrel 10. The motor 55 is of a variable speed type and the apparatus may therefore be further adjusted as to the speed of the mandrel 10 by varying the speed of the motor 55. The same driving motion from the motor 55 and the belt pulley 70 is imparted to the sprocket 69 which is keyed to the drive shaft 68 of the speed reducer 66 and is conveyed by the drive chain 74 to the jack shaft 65. The gears 81, 81 convey this relatively rapid motion to the threaded shaft 27.

At such time as it is desired to reverse the direction of the threaded shaft 27 to cause the carriage 29 to move toward the housing 21 so that another cycle can be commenced, the gears 81, 81 are removed from the jack shaft 65 and the unthreaded end portion of the threaded shaft and sprockets (not shown) are substituted and a drive chain positioned thereover so that the motion of the threaded shaft 27 is reversed.

In order that the threaded shaft 27 may be driven slowly both the gears 81 and the substitute sprockets, not shown, are removed from the jack shaft 65 and the unthreaded end portion of the threaded shaft 27 and a clutch, which is positioned on the threaded shaft 27, is engaged to connect the threaded shaft 27 with the main shaft 63. This is accomplished by the provision of a clutch portion 82 rotatably mounted on the unthreaded end portion of the threaded shaft 27 and which rotatable portion carries gear 83 which is meshed with a gear 84 on the jack shaft 65. The other portion of the clutch comprises a matching clutch member 85 slideably mounted on the threaded end portion of the threaded shaft 27 and splined thereto. A slideable bracket 86 mounted on a shaft 87 and having an extending arm 88 engaged in an annular groove 89 of the clutch member 85 serves to move the same longitudinally of the unthreaded end portion of the threaded shaft 27. Motion is imparted to the slideable bracket by a crank 90 having a manually movable handle 91 as best seen in Figure 10 of the drawings.

In operation, the cone shaped spacing member 42 is positioned near the housing 21, a plurality of wire cables C are cut and positioned longitudinally of the apparatus on the cable supporting arms 44, 44 as heretofore described with their ends trained over the cone shaped spacing member 42 and clamped in position on the tubular mandrel 10 by the band 54. The motor 44 is energized and the mandrel 10 is revolved slowly by the main shaft 63 which is driven by the speed reducer 66 as heretofore described. Simultaneously, the threaded shaft 27 is revolved rapidly and the carriage 29 travels away from the housing 21 along the rails 28, 28 moving the cone shaped spacing member 42 axially of the mandrel 10 which causes the wire cables C to be wound thereabout in an even unbroken layer on the mandrel 10 and the rubber and canvas layers previously formed thereon. The layer of wire cables C positioned in spiral formation are evenly tensioned by the device and the individual wire cables are positioned in side by side relation on an even horizontal plane along any surface thereof.

As the carriage 29 and the cone shaped spacing member 42 approach the various rollers 52, 52 which support the tubular mandrel 10 and the partly formed hose thereon the elongated arm 35 carried by the carriage 29 engages the switch control levers 37 controlling the air valves for the air cylinders supporting the rollers 52, 52 and cause the same to retract one at a time and remain retracted until the carriage 29 and the cone shaped spacing member 42 have passed the same whereupon the arm 35 disengages the switch control lever 37 and the air cylinder again elevates the rollers 52 into supporting engagement beneath the tubular mandrel 10 and the partially formed hose thereon which now includes the first layer of the wire cables C.

As the carriage 29 and the cone shaped spacing member 42 move along the bench 24 from left to right as seen in Figures 1 and 10 of the drawings the successive air cylinders 49 lower the successive rollers 52 and thereby clear the passageway for the cone shaped spacing member 42. As the cone shaped spacing member 42 approaches each of the hinged brackets 46 the same are moved from vertical position to horizontal position thereby moving the cable support arms 44, 44 out of the way and at the same time disengaging them from the plurality of wire cables C which are thereby freed for movement into their paths over and around the cone shaped spacing member 42. When the carriage 29 and the cone shaped spacing member 42 reach the extreme outer end of the apparatus, the right end, as seen in Figure 1 of the drawings, a band, not shown, is applied to hold the cables in position on the partially formed hose on the tubular mandrel 10. The gears 81 are removed from the jack shaft and the unthreaded end portion of the threaded shaft 27 and sprockets, not shown, are substituted for the gears 81 and a drive chain trained thereover. The motor 55 is then energized to cause the threaded shaft 27 to revolve in the opposite direction and cause the carriage 29 to move from right to left along the rails 28, 28 and back towards its starting position adjacent the housing 21. The direction of rotation of the main shaft 63 is then reversed so that the tubular mandrel 10 will turn in the opposite direction. Another set of wire cables are positioned on the cable supporting arms 44, 44 of the device and the second layer of wire cables are wound spirally on the partly formed hose in the direction opposite to that of the first layer of the wire cables. A second layer of canvas and rubber are then applied and then the rubber tube comprising the covering 17 is positioned thereon to complete the hose.

In order that the hose thus formed can be cured by vulcanization, it is necessary that a wrapping of fabric tape be applied to confine the rubber of the covering tube 17 and the apparatus disclosed herein provides means for applying such fabric wrapping tape. By referring to Figures 2, 3 and 10 of the drawings an idler roller 92 will be seen to be rotatably mounted on a depending portion of the carriage 29 adjacent the cone shaped spacing member 42. The fabric tape 18 as seen in Figure 2 is supplied from a hand reel 93 and trained in under the idler 92 and wrapped around the hose so as to spirally wrap the covering tube 17. In order to apply this tape it is necessary that the carriage 29 move along the rails 28, 28 and in order to impart motion thereto the gears 81 are removed from the ends of the jack shaft 65 and the unthreaded end portion of the threaded shaft 27, the clutch comprising the parts 82 and 85 is engaged by moving the part 85 as hereinbefore described so that it engages the part 82, the motor 55 is actuated and the motion of the main shaft 63 is conveyed by the way of the sprockets 75, drive chain 77 and sprockets 76 to the gears 84 and 83 and thereby through the clutch parts 82 and 85 to the threaded shaft 27. The workman is therefore able to walk along the apparatus guiding the fabric wrapping tape 18 as it is progressively positioned on the hose on the rotating mandrel 10. When the full length of the hose has been wrapped with the fabric tape 18 the coupling 22 which is positioned in the transverse end portion 23 of the apparatus is released by the actuation of a bolt 94 which permits the coupling 22 to be moved axially away from the end of the tubular mandrel 10. The bolt and nut 79 are removed from the collar 19 and the tubular mandrel 10 and the hose thereon may then be removed from the apparatus and taken to a curing chamber as will be understood by those skilled in the art.

It will thus be seen that apparatus for making flexible spiral wound wire hose has been disclosed which meets the several objects of my invention, and having thus described my invention what I claim is:

1. Apparatus for making flexible spiral wound wire hose comprising an elongated bench having rails extending therealong and a carriage movable along said rails, mechanical means for imparting movement to said carriage, a cable spacing member positioned on said carriage and having a central opening therein, a tubular mandrel positioned in parallel relation to said rails and through said central opening in said cable spacing member, detachable couplings on the ends of said tubular mandrel and mechanical means adjacent one of said couplings for imparting rotary motion thereto, a plurality of longitudinally spaced mandrel supporting roller devices, each of said roller devices including a vertically extendable device journalling said rollers, means for actuating said vertically extendable devices responsive in operation to said carriage, and a plurality of cable support members positioned in longitudinally spaced arrangement in said apparatus, each of said cable supporting members comprising a pair of V shaped arms having a plurality of notches formed diagonally therein, and tensioning members on said cable spacing member on said carriage for engaging and guiding cables trained thereover and wrapped around said mandrel.

2. The apparatus set forth in claim 1 and wherein said cable tensioning members on said cable spacing member on said carriage comprises a plurality of studs positioned circumferentially and radially on one side of said cable spacing member.

3. The apparatus set forth in claim 1 and wherein said mechanical means for moving said carriage along said rails comprises an elongated threaded shaft positioned in parallel relation to said rails and wherein said carriage has a member having a threaded opening therein engaged on said threaded shaft and a source of rotary motion for rotating said threaded shaft.

4. The apparatus set forth in claim 1 and wherein said cable spacing member comprises a conical member and wherein the cable tensioning members comprise pins positioned on said conical member in staggered relation to one another.

5. The apparatus set forth in claim 1 and wherein each of said mandrel supporting roller devices comprises an air actuated piston and cylinder assembly with said rollers journalled on said piston.

6. The apparatus set forth in claim 1 and wherein the means for actuating said vertically extendable devices comprises an actuating arm attached to said carriage and positioned in spaced parallel relation to said rails and a plurality of lever actuated air valves positioned on said bench in the path of said actuating arm.

7. The apparatus set forth in claim 1 and wherein the mechanical means for imparting movement to said carriage comprises an elongated threaded shaft positioned in parallel relation to said rails and journalled on said bench, a source of rotary motion and a jack shaft, means connecting said source of said rotary motion with said jack shaft and a clutch releasably connecting said jack shaft with said elongated threaded shaft, a depending member on said carriage having a threaded opening therein and engaged on said elongated threaded shaft.

8. The apparatus set forth in claim 1 and wherein said mechanical means for imparting rotary motion to one of said couplings comprises a source of rotary motion, a speed reducing device, means connecting said source of rotary motion with said speed reducing device, a main driven shaft connected to said speed reducing device and to said coupling.

9. The apparatus set forth in claim 1 and wherein one of said detachable couplings on one end of said tubular mandrel is movable axially of said mandrel and journalled in a portion of said bench for rotary movement relative thereto.

10. The apparatus set forth in claim 1 and wherein said cable spacing member is positioned at one side of said carriage and comprises a conical device having a central opening therethrough, and wherein said tensioning members thereon comprise a plurality of pins arranged in radially spaced circumferentially extending rows on the conical exterior of said conical device and an annular ring positioned in spaced relation about said conical device and with said pins forming tensioning passageways for cables trained over said cable spacing member.

11. The apparatus set forth in claim 1 and wherein said carriage comprises a body member having supporting rollers on its lower surface engaging said rails and having depending side portions extending downwardly along side said rails and rollers journalled thereon engaging the sides of said rails.

12. The apparatus set forth in claim 1 and wherein each pair of V-shaped arms comprising said cable supporting members are pivotally mounted on said bench and movable from a normal vertical position to a horizontal position to provide clearance for said cable spacing member and carriage.

13. Apparatus for making flexible spiral wound wire hose comprising an elongated bench having a pair of rails extending therealong in parallel relation to one another, a carriage having wheels thereon positioned on said rails for movement therealong, an elongated threaded shaft journalled on said bench and a depending portion of said carriage having a threaded portion thereof engaged on said elongated threaded shaft, a drive mechanism at one end of said elongated bench, said drive mechanism including a source of rotary motion, a jack shaft and a clutch mechanism detachably connecting said jack shaft and said elongated threaded shaft, and means connecting said source of rotary motion with said jack shaft, a speed reducing device connected with said source of rotary motion, a main driven shaft connected to said speed reducing device and a coupling on said main driven shaft, an upright end portion at the opposite end of said elongated bench, a second coupling rotatably mounted therein, said second coupling being movable longitudinally of said bench, a tubular mandrel normally positioned with its ends in said couplings and extending therebetween, means for supporting said tubular mandrel intermediate said couplings, said means comprising a plurality of air actuated piston and cylinder assemblies having vertically disposed piston rods and rollers journalled in brackets on said piston rods and positioned beneath said tubular mandrel at spaced intervals along said apparatus, lever controlled air valves on said bench controlling the air supply from said piston and cylinder assemblies, an actuating arm on said carriage positioned for progressive engagement with said lever controlled air valves, a cable spacing and tensioning member positioned on said carriage and encircling said tubular mandrel, said spacing member including a conical body member having an opening therethrough axially thereof and an annular ring spaced with respect to said conical body member and a plurality of pins arranged in a plurality of radially spaced circumferentially extending rows on said conical member and defining with said annular ring passageways for guiding and tensioning a plurality of cables, a plurality of cable support arms positioned in spaced relation longitudinally of said bench, said cable support arms having means for individually engaging and spacing a plurality of cables, said means comprising cable holding formations on said arms, and brackets hinged to said bench and supporting said cable support arms.

References Cited in the file of this patent

UNITED STATES PATENTS

| | | |
|---|---|---|
| 330,047 | Patterson | Nov. 10, 1885 |
| 2,342,342 | Hotchkiss | Feb. 22, 1944 |
| 2,461,231 | Oppenheim | Feb. 8, 1949 |